Figure 1:
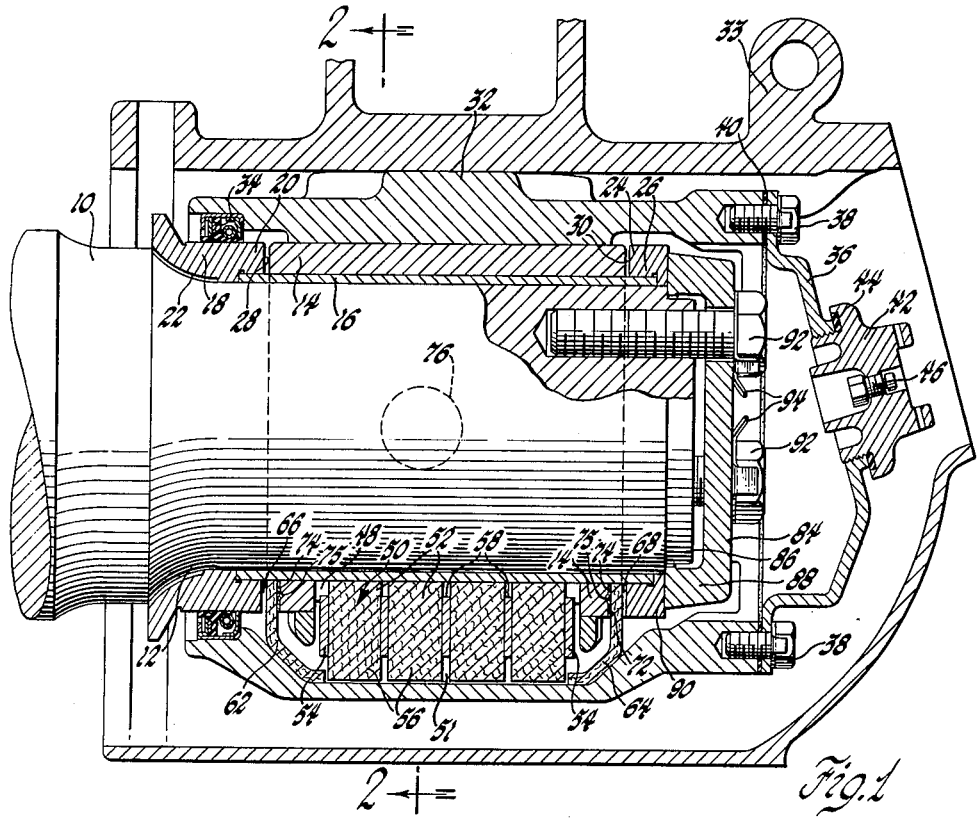

Oct. 12, 1965    E. J. CLARK ETAL    3,211,501
JOURNAL BEARING ASSEMBLY
Filed Oct. 3, 1962

INVENTORS
Earl J. Clark &
John A. Clements
BY
*[signature]*
ATTORNEY

United States Patent Office 3,211,501
Patented Oct. 12, 1965

3,211,501
JOURNAL BEARING ASSEMBLY
Earl J. Clark, Grosse Pointe, Mich., and John A. Clements, Brownsburg, Ind., assignors to General Motors Corporation, Detroit, Mich., a corporation of Delaware
Filed Oct. 3, 1962, Ser. No. 228,114
8 Claims. (Cl. 308—83)

This invention relates generally to a journal and bearing assembly and more particularly to an improved composite or package-type bearing assembly adapted for use with railway car journals.

The journal bearing assembly of the present invention is particularly valuable for use on railway passenger and freight cars in which two-directional lateral thrust is encountered. The invention also comprehends a package-type bearing assembly having major components which may be factory assembled, thereby facilitating installation of the assembly in the field.

In operation, railway cars exhibit lateral thrust in two directions, the duo-directional lateral thrust being more predominant in freight cars. Excessive lateral movement is particularly unsatisfactory since it results in an undesirable side sway of the railway car and substantially increases wear of the journal bearings. Therefore, superior performance in the operation of the journal bearing assemblies in railway cars is obtained if the bearing assembly has appropriate stops included on each end of the bearing to inhibit excessive lateral movement of the journal. The proper positioning of the stops and the other parts of the assembly on installation is very critical to the proper functioning of the entire bearing assembly when in use. Since the assemblies are usually installed and repaired in railway yards, a journal bearing assembly of the type contemplated must lend itself to easy and accurate installation and maintenance work.

Installation of an ordinary journal bearing assembly in the field is often a time-consuming job involving costly apparatus and a great deal of labor. Usually each of the parts constituting the assembly must be separately installed, often requiring special tools and skill. The usual procedure is to shrink-fit the thrust rings and sleeve onto the journal portion of the axle. Since clearances and tolerances between these parts must be checked on the spot in the field, this procedure requires special equipment and a certain degree of skilled workmanship. After this time and labor-consuming operation has been completed, the rest of the assembly is built up around the parts that have been secured to the journal. This again involves a time and labor-consuming operation as well as special equipment. In addition, the individual handling of each part of the assembly increases the likelihood of damage to the parts due to improper handling in the field, thus also contributing greatly to increased installation and maintenance costs and even more costly operational delays.

It is therefore an object of our invention to provide an improved journal bearing construction which will inhibit the duo-directional lateral movement of railway cars. Another object of our invention is to provide an improved journal bearing construction in which major components of the assembly may be factory assembled, thereby minimizing handling in the field and reducing installation and maintenance costs. The invention also decreases storage costs resulting from the necessity of stocking the assembly parts in the field.

The above and other objects of our invention are attained by a journal bearing assembly having an inner and outer thrust ring secured to the ends of a journal sleeve, a bearing positioned around the sleeve in axial alignment between the thrust rings, sealing means, securing means and a lubricator means positioned within a housing. These parts are assembled as a unit, the unit assembly being secured on the journal portion of an axle. A cap is positioned over the outer end of the journal portion, a cover plate is attached to the outer end of the housing, and the housing is located within a journal side frame.

Figure 2:
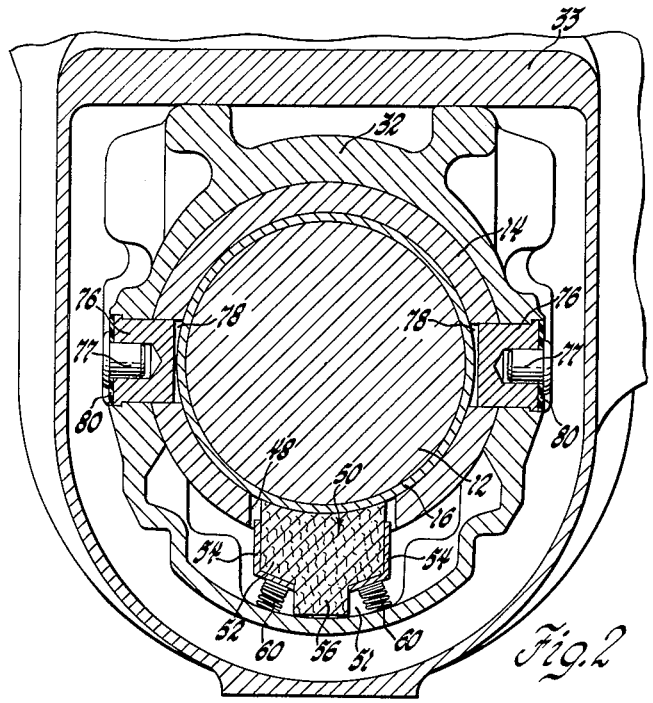
Figure 3:
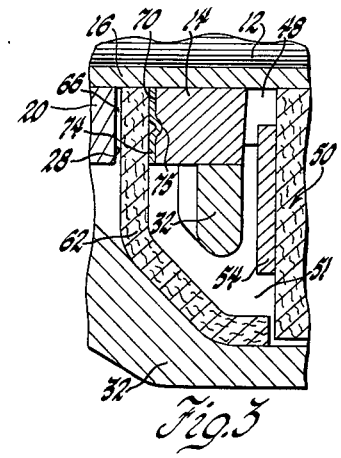

Other objects and advantages of our invention will more fully appear from the following detailed description, reference being made to the accompanying drawing, in which:

FIGURE 1 is a longitudinal sectional view of a journal bearing assembly embodying the present invention;
FIGURE 2 is a cross-sectional view along the line 2—2 of FIGURE 1; and
FIGURE 3 is an enlarged cross-sectional view of the lower left hand portion of the assembly as shown in FIGURE 1.

Referring more specifically to the drawing, the journal bearing assembly embodying the present invention is shown as having an axle 10 with a journal portion 12 rotatably supported within a cylindrical sleeve bearing 14. The journal portion of the axle is provided with a hardened, wear-resistant, cylindrical sleeve 16 which is in tight circumferential contact with the journal portion of the axle and is rotatable therewith. An inner thrust ring 18 is press-fitted around one end of the sleeve adjacent the axially inner end of the journal portion. Thus, the sleeve extends beneath an annular flange 20 on the thrust ring and is in tight circumferential contact with it. The thrust ring also is firmly seated on the filleted portion 22 of the journal portion of the axle and is rotatable therewith.

An outer thrust ring 24 is press-fitted around the other end of the sleeve adjacent the axially outer end of the journal portion of the axle. Thus, the sleeve extends beneath an annular flange 26 on the outer thrust ring and is in tight circumferential contact with it. The outer thrust ring also is in firm contact with the journal portion of the axle adjacent its axially outer end and is rotatable therewith. Prior to press-fitting the outer thrust ring on the sleeve, the bearing 14 is positioned around the sleeve. Thus, the bearing is in axial alignment with the inner and outer thrust rings. The ends of the bearing are axially spaced apart from the inner and outer thrust rings. This spacing permits only restricted lateral movement of the journal portion within the bearing since the end play of the journal portion is limited by the hardened thrust face 28 of the inner thrust ring 18 and the hardened thrust face 30 of the outer thrust ring 24.

A housing 32, which is prevented from rotating by a journal side frame 33, surrounds the bearing 14 and the aforementioned parts secured to the journal portion of the axle. An annular oil seal 34 is provided between the axially inner end of the housing and the smooth outer peripheral surface of the inner thrust ring 18. Hence, the oil seal prevents the loss of lubricant from the inner end of the housing. A cover plate 36 is shown as removably secured to the axially outer end of the housing by screws 38. A sealing gasket 40 is positioned between the outer end of the housing and the cover plate. As shown on the drawing, a removable oil filler plug assembly is provided in the cover plate 36 to permit the addition of lubricant to the housing. The filler plug assembly consists of a removable plug member 42 and an annular sealing gasket 44 positioned between an annular flange on the plug member and an annular flange on the cover plate to provide a tight seal therebetween. The filler plug assembly also contains a pressure relief valve 46 which is removably secured within a central opening in the plug member. The pressure relief valve is designed to prevent the loss of lubricant through the housing seals 34 and 40 due to excessive pressure build-up within the housing.

Lubrication of the contacting surfaces of the bearing 14 and the sleeve 16 is achieved by a device located in the bottom of the housing. An elongated opening 48, of lesser length than the bearing 14, is shown as extending through the lower portion of the bearing. A wick-type lubricator 5 is located within the lower portion of the housing 32 and extends from the lubricant reservoir 51 therein through the opening 48 into contact with the bearing surface of the sleeve 16, lubricant being drawn up through the wick material by capillary action. This wick-type lubricator is shown as consisting of a plurality of felt pads 52 positioned within a holder 54, the bottom portion 56 of the pads being of reduced width and extending through the holder into the lubricant in the reservoir. Separator plates 58 are positioned between the pads, the combination of pads and plates being retained in fixed position by means of the holder. As shown in FIGURE 2, the lubricator 50 is maintained against the sleeve 16 with a desired amount of pressure by means of a number of coil springs 60. These springs are seated on the bottom wall of the housing 32 and exert pressure upwardly against the lower walls of the holder 54 on both sides of the pad portions 56.

Lubrication of the hardened thrust faces 28 and 30 of the thrust rings 18 and 24 also is provided by means of a wick-type lubricator. As shown in FIGURES 1 and 3, a relatively flat wick 62 extends from the lubricant reservoir 51 in the bottom of the housing up into a groove 66 formed between the inner thrust ring 18 and an adjacent recessed portion 70 of the lower end surface of the bearing 14 immediately above the reservoir. Similarly, as shown in FIGURE 1, a second flat wick 64 projects upwardly from the lubricant reservoir into another groove 68 between the outer thrust ring 24 and an adjacent recessed portion 72 of the lower end surface of the bearing. The wicks 62 and 64 are removably retained within grooves 66 and 68, respectively, by means of a snap-in-type clip 74, the sides of which clamp into the wicks. The clips have axially protruding dimples 75 which engage small recesses in the outer end faces of the bearing. In this manner the lubricators are maintained in operative position while at the same time being readily removable for replacement.

As is clearly disclosed in the drawing, the bearing 14 is in intimate contact with the housing 32 over the greater portion of its outer surface. In this manner the dissipation of heat generated in the bearing is greatly facilitated. As is shown in FIGURE 2, the bearing is locked to the housing by means of a pair of steel dowels 76 located on opposite sides of the bearing approximately midway between the ends of the journal. These dowels are press-fitted into aligned openings which extend through both the housing and the bearing. Studs 77 are forcibly driven into central openings in the dowels to cause them to expand and tightly engage the housing 32. Inasmuch as the bearing must withstand thrust in two axial directions in addition to the frictional drag due to the rotation of the journal, the dowels are of relatively large diameter and contact the bearing substantially throughout its entire thickness. However since the openings in the bearing extend completely through the member while the dowels do not frictionally engage the hardened sleeve 16, it is apparent that chambers 78 are formed between the sleeve and the inner end of the dowels 76. These chambers function as reservoirs for excess lubricant and lubricant vapors, thus assuring adequate lubrication of the journal. As shown on the drawing, each dowel is provided with an annular seal 80 which is retained in position by the studs 77. These seals prevent loss of lubricant through the dowell openings.

The following sequence of steps is preferred in assembling the major parts of the bearing assembly. The inner thrust ring 18 is first press-fitted over one end of the hardened sleeve 16. The bearing 14, lubricator means and sealing means next may be built up around the sleeve and positioned within the housing 32. The outer thrust ring 24 then is press-fitted over the outer end of the sleeve; and a thin coating of a lubricant, such as molybdenum disulfide or the like, is spread over the journal portion 12 of the axle. An aligning tool having a diameter slightly smaller than the diameter of the journal portion of the axle is positioned adjacent the outer end of the journal portion. Next, the assembled parts are positioned around the aligning tool in the usual manner and are subsequently pressed on the journal portion 12 of the axle by means of a hydraulic ram or the like, until the inner thrust ring is firmly seated on the annular filleted portion 22 of the journal portion of the axle.

The entire assembly is secured in place by a cap 84 positioned over the axially outer end of the journal 12, which has an integral cylindrical relief portion 86 of reduced diameter extending into the concave recess in the cap. This cap 84 has an inwardly extending annular flange 88 abutting the annular shoulder formed by the relief portion of the journal portion of the axle. The flange on the cap also abuts the outer radial surface 90 of the outer thrust ring 24. The cap 86 is shown as removably secured to the journal portion by means of a number of threaded bolts 92 and lock washers 94.

When all components of the bearing assembly are properly assembled in the foregoing manner, the cover plate 36 is attached to the housing, and the assembly is positioned within the journal side frame 33.

It will be seen that the major parts of the above-described bearing assembly may be factory assembled, the major parts consisting of the inner and outer thrust rings press-fitted over the hardened sleeve, the bearing and the housing with the lubricator and sealing means built up on the sleeve. The assembled parts may then be pressed as a package assembly over the journal portion of the axle so that intimate contact will be achieved between the sleeve, thust rings and the journal portion of the axle. The rotatable parts are finally secured to the journal portion by positioning a cap over the end of the journal. The cover plate is then secured to the housing and the assembly is completed when the housing is secured within the journal side frame. This package construction greatly reduces the amount of handling required in the field and minimizes storage problems.

While we have described our invention by means of a preferred embodiment, it should be understood that various modifications may be made without departing from the intended scope of the invention as defined by the following claims:

We claim:

1. A package type bearing assembly comprising a housing having openings at opposite ends thereof, a generally cylindrical bearing within said housing, said bearing being secured to said housing by two diametrically opposed steel dowels, a generally cylindrical sleeve within said bearing, an inner thrust ring press-fitted on one end of said sleeve, an outer thrust ring press-fitted on the other end of said sleeve, said bearing positioned around said sleeve and axially aligned between said inner thrust ring and said outer thrust ring, the lower portion of said bearing having an opening, means for applying said lubricant to the thrust bearing surfaces of said inner and outer thrust rings, means for sealing said opposite ends of said housing, and means for introducing said lubricant into said assembly, said thrust rings and said sleeve member being adapted to be secured on the journal portion of an axle.

2. A journal and bearing assembly comprising a housing, a journal rotatably supported within said housing, a relief portion on the axially outer end portion of said journal providing an annular seat, a hardened, wear-resistant annular sleeve surrounding said journal and secured thereto, an inner thrust ring press-fitted on said sleeve and on the axially inner end of said journal, an outer thrust ring press-fitted on said sleeve and on said journal adjacent said relief portion of said journal, a cap detachably secured to said journal over said relief portion and abutting said outer thrust ring, a bearing positioned around said sleeve between said inner thrust ring and said outer thrust ring, the lower portion of said bearing having an opening therein, means for applying a lubricant to said sleeve through said opening, means for applying said lubricant to the thrust bearing surfaces of said inner and outer thrust rings, and means for introducing said lubricant into said assembly.

3. A journal and bearing assembly comprising a housing, a journal rotatably supported within said housing, a wear-resistant sleeve press-fitted on said journal in tight circumferential contact therewith, an inner thrust ring press-fitted on said sleeve, said inner thrust ring having an annular flange, said flange on said inner thrust ring having an inner annular surface in tight circumferential contact with said sleeve and an end surface providing a hardened thrust bearing surface, said inner thrust ring being adjacent the axially inner end of said journal and in contact with said journal, an outer thrust ring press-fitted on said sleeve, said outer thrust ring having an annular flange, said flange on said outer thrust ring having an inner annular surface in tight circumferential contact with said sleeve and an end surface providing a hardened thrust bearing surface, said outer thrust ring being in contact with said journal adjacent the axially outer end of said journal, a bearing positioned around said sleeve between said inner and outer thrust rings, the end surfaces of said bearing being in axial alignment with said corresponding thrust bearing surfaces of said inner and outer thrust rings, the lower portion of said bearing having an opening therein, means for applying a lubricant to said sleeve through said opening, the lower end portions of said bearing having recesses forming grooves between said bearing and said thrust rings, means for applying said lubricant to said thrust bearing surfaces of said inner and outer thrust rings through said grooves, and means for introducing said lubricant into said assembly.

4. A journal and bearing assembly comprising a housing, a journal rotatably supported within said housing, a hardened, wear-resistant annular sleeve secured to said journal and rotatable therewith, an inner annular thrust ring press-fitted on said sleeve, said inner thrust ring having an annular flange, the inner annular surface of said flange on said inner thrust ring being in intimate contact with said outer circumferential surface of said sleeve, the end surface of said flange providing a hardened thrust surface, said inner thrust ring having an inner annular filleted surface in contact with said journal adjacent said axially inner end of said journal, an outer thrust ring press-fitted on said sleeve, said outer thrust ring having an inwardly extending annular flange, the inner annular surface of said flange on said outer thrust ring in intimate contact with the outer circumferential surface of said sleeve and the end surface of said flange on said outer thrust ring providing a hardened thrust bearing surface, said outer thrust ring being in contact with said journal adjacent the axially outer end of said journal, a bearing positioned around said sleeve, the inner and outer end surfaces of said bearing being in axial alignment with said corresponding thrust bearing surfaces of said inner and outer thrust rings, the lower portion of said bearing having an opening therein, means for applying a lubricant to the surface of said sleeve through said opening, said inner and outer end surfaces of said bearing having recesses therein, said recesses providing grooves between the lower end portions of said bearing and said inner and outer thrust rings, means for applying a lubricant to said thrust bearing surfaces through said grooves, and means for introducing said lubricant into said assembly.

5. A journal and bearing assembly comprising a housing, a journal rotatably supported within said housing, a wear-resistant annular sleeve circumferentially engaging said journal, an inner thrust ring circumferentially engaging said sleeve and the axially inner portion of said journal, an outer thrust ring circumferentially engaging said sleeve and the axially outer portion of said journal, a bearing positioned around said sleeve in axial alignment between the opposed thrust bearing surfaces of said inner thrust ring and said outer thrust ring, the lower portion of said bearing having an opening therein, a wick-type lubricator in contact with said sleeve through said opening, said wick-type lubricator comprising a holder, a plurality of felt pads supported by said holder, separator plates between said pads, said pads having a bottom portion extending below said holder into a lubricant reservoir, said lubricant reservoir being formed by the lower portion of said housing, said felt pads being held against said sleeve by spring members attached to said holder, one wick-type lubricator comprising a felt pad positioned in each of two separate grooves provided between both lower and surfaces of said bearing and said corresponding adjacent thrust bearing surfaces of said inner and outer thrust rings and being held in contact with said thrust bearing surfaces by retainer clips secured to said pads and to said bearing, and means for introducing a lubricant into said assembly.

6. A journal and bearing assembly comprising a housing, a journal rotatably supported within said housing, a wear-resistant annular sleeve secured to said journal, an inner thrust ring secured to said sleeve and to said journal adjacent the axially inner end of said journal, an outer thrust ring secured to said sleeve and to said journal adjacent the axially outer end of said journal, a bearing positioned around said sleeve between the thrust bearing surfaces, said inner thrust ring and said outer thrust ring, the lower portion of said bearing having an opening therein, a wick-type lubricator in contact with the outer circumferential surface of said sleeve through said opening, a wick-type lubricator positioned in each of two grooves provided between each end of said bearing and the corresponding thrust bearing surfaces of said inner and outer thrust rings, said housing having a cover plate, said cover plate being attached to said housing by means of threaded bolts, a sealing gasket between said cover plate and said housing, said cover plate having a filler plug assembly, said filler plug assembly comprising a plug member, an annular sealing gasket and a pressure relief valve, said relief valve being spring biased to permit reduction in pressure built up in the chambers formed between said bearing and said housing, said housing being closed to prohibit free exchange of atmosphere therein, said housing and said bearing being provided with axially aligned openings, a dowel extending through each of said aligned openings to interconnect said bearing with said housing and to prevent relative rotational and longitudinal movement therebetween, the inner end of said dowel being spaced from the surface of said sleeve thus forming a lubricant reservoir in said bearing to insure adequate lubrication, and means for introducing said liquid into said assembly.

7. A journal and bearing assembly comprising a housing, a journal rotatably supported within said housing, a relief portion on the outer end of said journal, an annular wear-resistant sleeve secured to said journal, an inner thrust ring secured to said sleeve and to the axially inner end of said journal, an outer thrust ring secured to said sleeve and to the axially outer end of said journal, a generally cylindrical plain bearing positioned around said sleeve in axial alignment between the thrust bearing surfaces of said inner thrust ring and said outer thrust ring, the lower portion of said bearing having an opening extending longitudinally therein, means for applying a lubricant to said sleeve through said opening, means for applying a lubricant to said thrust bearing surfaces of said inner and outer thrust rings, said housing having a cover plate, said cover plate being attached to said housing by means of threaded bolts, a sealing gasket between said cover plate and said housing, said cover plate having a filler plug assembly, said filler plug assembly consisting of a plug member, a sealing member and a pressure relief valve, said relief valve being spring biased to reduce pressure built up in the chambers formed between said bearing and said housing body, said housing and said bearing being provided with axially aligned openings, a dowel extending through said aligned openings to interconnect the bearing with the housing and to prevent relative rotational and longitudinal movement therebetween, the inner end of said dowel being spaced from the surface of said sleeve thus forming a lubricant reservoir in said bearing, an annular oil seal provided between the inner end of said housing and said inner thrust ring, and means for introducing said lubricant into said assembly.

8. A journal and bearing assembly comprising a housing, a journal rotatably supported within said housing, a wear-resistant sleeve surrounding said journal and secured thereto, a thrust ring press-fitted on said sleeve and said journal adjacent the axially inner end of said journal, another thrust ring press-fitted on said sleeve and said journal adjacent the axially outer end of said journal, a bearing positioned around said sleeve between said inner thrust ring and said outer thrust ring, means for applying a lubricant to the thrust bearing surfaces of said thrust rings, said bearing having an opening through its lower wall portion, and means for applying said lubricant to said sleeve through said opening.

References Cited by the Examiner
UNITED STATES PATENTS

| | | | |
|---|---|---|---|
| 288,489 | 11/83 | Proctor. | |
| 1,416,884 | 5/22 | Schmidt | 308—132 |
| 2,480,114 | 8/49 | Bradbury | 29—149.5 |
| 2,763,915 | 9/56 | Morgan | 29—149.5 |
| 2,855,248 | 10/58 | Rovtar | 308—83 |
| 2,926,970 | 3/60 | Clark | 308—83 |

ROBERT C. RIORDON, *Primary Examiner.*

FRANK SUSKO, *Examiner.*